(12) United States Patent
DeBoer et al.

(10) Patent No.: US 9,434,268 B2
(45) Date of Patent: Sep. 6, 2016

(54) ELECTRICAL DISTRIBUTION SYSTEM RECHARGING STATION FOR ELECTRIC VEHICLES

(75) Inventors: John DeBoer, Denver, CO (US); Russell T. Watford, Lawrenceville, GA (US); Henry Fisher, Dunwoody, GA (US); John Quentin Cowans, Decatur, GA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 270 days.

(21) Appl. No.: 12/844,950

(22) Filed: Jul. 28, 2010

(65) Prior Publication Data

US 2011/0037429 A1 Feb. 17, 2011

Related U.S. Application Data

(60) Provisional application No. 61/232,964, filed on Aug. 11, 2009, provisional application No. 61/316,098, filed on Mar. 22, 2010, provisional application No. 61/320,801, filed on Apr. 5, 2010.

(51) Int. Cl.
*B60L 11/18* (2006.01)

(52) U.S. Cl.
CPC ........ *B60L 11/1838* (2013.01); *B60L 11/1816* (2013.01); *B60L 11/1825* (2013.01); *B60L 2230/16* (2013.01); *Y02T 10/7005* (2013.01); *Y02T 10/7088* (2013.01); *Y02T 90/121* (2013.01); *Y02T 90/128* (2013.01);
(Continued)

(58) Field of Classification Search
CPC ............ B60L 11/1816; B60L 11/1825; B60L 11/1838; Y02T 10/7088
USPC .......................................................... 320/109
See application file for complete search history.

(56) References Cited

U.S. PATENT DOCUMENTS 5,596,258 A 1/1997 Kimura
5,875,087 A * 2/1999 Spencer et al. ................. 361/87
(Continued)

FOREIGN PATENT DOCUMENTS

WO 2009102082 A2 8/2009

OTHER PUBLICATIONS

Translation of corresponding Chinese Office Action dated Oct. 15, 2013 corresponding to Chinese Application No. 201080035585.0 (28 pages).

*Primary Examiner* — Yalkew Fantu
*Assistant Examiner* — Manuel Hernandez

(57) ABSTRACT

An electric vehicle recharging station that can be readily incorporated into existing building electrical distribution systems during retrofit or new construction. The system has at least one enclosure and a vehicle charging connector. A circuit interrupter has line terminals for connection to respective first and second phases of the distribution system. A contactor relay has first and second phases coupled to the respective circuit interrupter and electric vehicle charging connector phases and separable contacts for each phase, for selective connection of electric power to the charging connector. A recharger controller is coupled to the contactor, for causing selective separation and closing of the separable contacts, so that electrical power is transferred to the electric vehicle. The recharging station system may also incorporate electric rate metering functions as well as communication capability from the controller to a remote controller. A human machine interface may be coupled to the controller.

13 Claims, 8 Drawing Sheets

(52) U.S. Cl.
CPC ............... *Y02T 90/14* (2013.01); *Y02T 90/16* (2013.01); *Y02T 90/163* (2013.01); *Y02T 90/168* (2013.01); *Y04S 30/12* (2013.01)

(56) References Cited

U.S. PATENT DOCUMENTS

| | | | |
|---|---|---|---|
| 6,081,205 A | 6/2000 | Williams | |
| 7,683,570 B2 * | 3/2010 | Krauer et al. | 320/104 |
| 7,701,313 B2 * | 4/2010 | Kim | 335/202 |
| 8,013,570 B2 * | 9/2011 | Baxter et al. | 320/109 |
| 2009/0020346 A1 | 1/2009 | Craven | |
| 2009/0021213 A1 * | 1/2009 | Johnson | 320/109 |
| 2009/0184689 A1 * | 7/2009 | Kressner | G01R 22/063 320/162 |
| 2010/0283426 A1 * | 11/2010 | Redmann | 320/109 |
| 2010/0301809 A1 * | 12/2010 | Bhade et al. | 320/148 |
| 2011/0029144 A1 * | 2/2011 | Muller et al. | 700/293 |
| 2011/0175569 A1 * | 7/2011 | Austin | 320/109 |
| 2011/0279082 A1 * | 11/2011 | Hagenmaier et al. | 320/109 |

\* cited by examiner

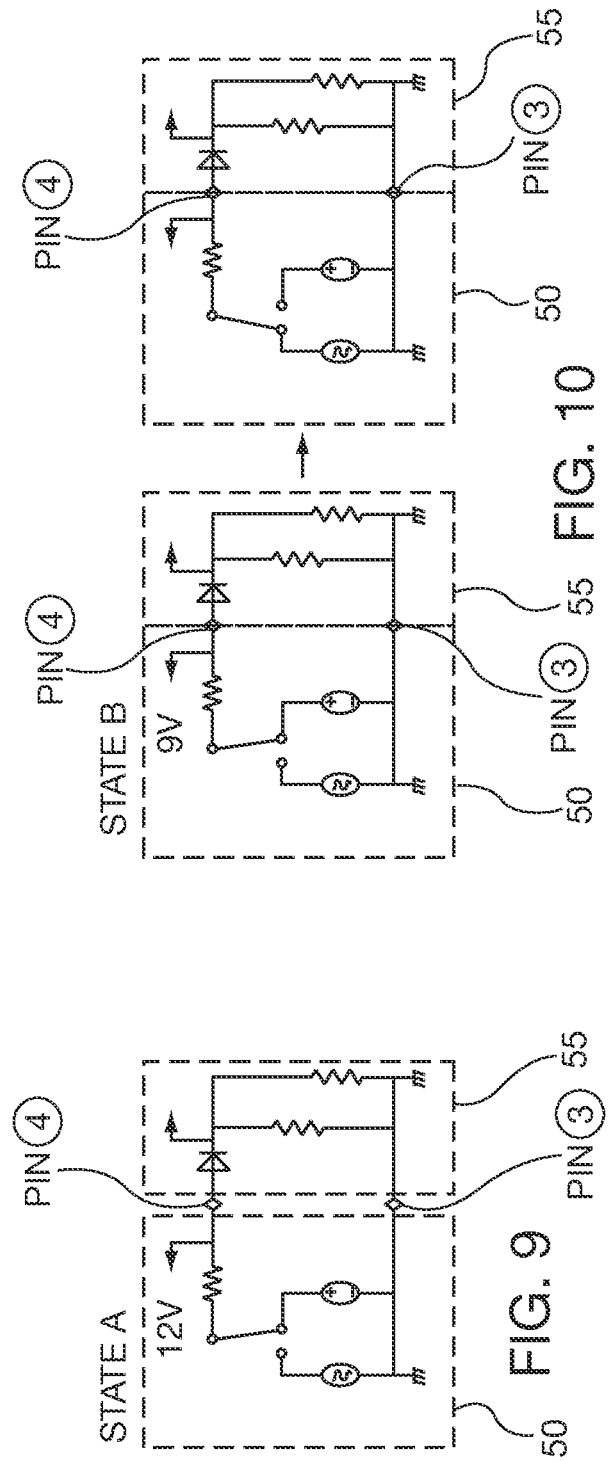

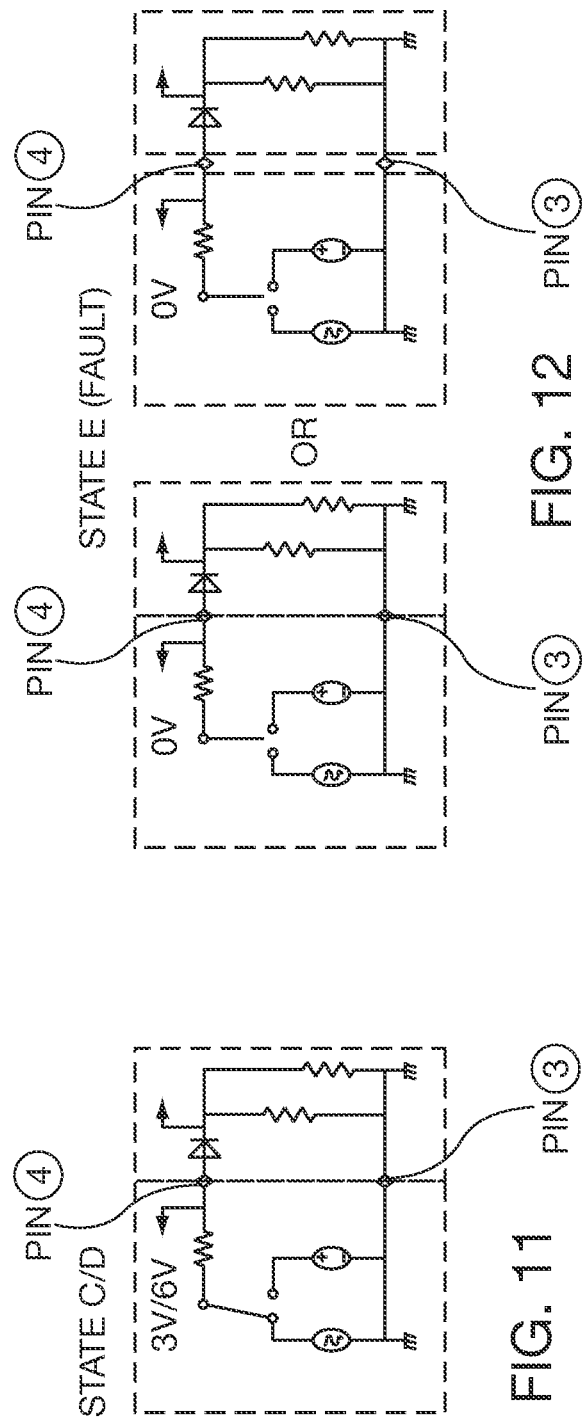

ELECTRICAL DISTRIBUTION SYSTEM RECHARGING STATION FOR ELECTRIC VEHICLES

CLAIM TO PRIORITY

This application claims the benefit of our U.S. provisional patent application entitled "Electric Vehicle Recharging Station" filed Aug. 11, 2009 and assigned Ser. No. 61/232,964; U.S. provisional patent application entitled "Residential Scale Electric Vehicle Recharge Station with Monitor" filed Mar. 22, 2010 and assigned Ser. No. 61/316,098; and U.S. provisional patent application entitled "Residential Scale Electric Vehicle Recharge Station with Monitor" filed Apr. 5, 2010 and assigned Ser. No. 61/320,801, which are incorporated by reference herein.

BACKGROUND OF THE DISCLOSURE

1. Field of the Invention

The invention relates to electric vehicle charging stations that are external a vehicle. The vehicle is charged by connecting the charging station to a vehicle outlet. This invention more particularly relates to recharging stations and methods for their use that are adapted for incorporation into existing standard building electrical distribution systems by electricians as part of a building electrical distribution system retrofit or new construction. The recharging system structural features and operation of the present invention incorporate technology that is generally familiar to electricians, electric power and distribution services providers, and building electrical distribution system design engineers.

2. Description of the Prior Art

While there is considerable technology literature devoted to on-board electric vehicle charging systems, primarily from the vehicle manufacturers and technology designers, there is relatively less devoted to the practical solutions of how electric power will be routed from an electric power grid to the vehicle. As a practical matter, demand for electric vehicles will be limited by the public's perception that it will be able to find readily available recharging stations.

In order to start satisfaction of public perception that vehicle charging stations will be available to the public in the near future, the vehicle industry has driven a solution for at least one Society of Automotive Engineers type J1772 standardized electrical connector configuration that is adapted for connection to a standard vehicle outlet (analogous to a standardized appliance cord plug and wired device outlet). However, there is a substantial need to create electric vehicle recharging station infrastructure on an ad hoc, ongoing basis, as electric vehicles become a larger part of the entire vehicle transportation base.

Electric vehicle recharging places higher demands on an existing building electrical distribution system than, for example, replacing an existing kitchen refrigerator or electric clothing dryer. A closer historical example was when building electrical distribution systems had to be reconfigured to accommodate central air conditioning climate control systems. When central air conditioning system technology became prevalent, building electrical distribution system designers, power producer and distribution service providers and electricians had to configure system upgrades for both the retrofit and new construction market. The same types of challenges now face the industry as it conforms to demands for electric vehicle recharging applications.

Relatively high sustained current draws necessary to charge electric vehicle batteries requires building electrical distribution system upgrades to protect the building distribution system, the vehicle being charged, and their associated operators during charging operations. Additional building distribution system electrical hardware must be capable of meeting electric codes, and conform to design standards (e.g., Underwriters Laboratories, Canadian Standards Association, etc.) necessary for a building owner to obtain property insurance coverage. As a practical matter new recharging equipment technology incorporated into building electrical systems must be familiar to electrical system designers, governmental electrical inspection authorities, electricians, building maintenance specialists and recharging operators if it is expected to be adopted quickly and in an economically efficient manner.

Thus, a need exists in the art for an electric vehicle recharging station system and method that can be readily added as an additional branch to existing building electrical distribution designs by building electrical system retrofit or during new construction. In this manner, a consumer can choose to purchase an electrical vehicle with confidence that home or work electrical distribution systems can be upgraded to accommodate the vehicle charging station quickly by licensed electricians, and that the installation will be approved by inspection authorities during the subsequent building permit review process.

SUMMARY OF THE INVENTION

Accordingly, an object of the invention is create an electric vehicle recharging station that can be incorporated into existing design building electrical distribution systems using knowledge already possessed by electricians, electrical system designers and building inspection authorities.

It is another object of the invention that such recharging stations be installed with similar effort and cost encountered when performing other types of known existing system upgrades or new construction.

These and other objects are achieved in accordance with the present invention by an electrical distribution system recharging station for electric vehicles, and method for its operation, that can be incorporated into residential, office and other commercial or industrial building environments. The recharging station is of modular construction and intended for incorporation into existing building electrical distribution systems using installation construction features and techniques well known and adopted by electricians, and already approved by building codes and governmental inspectors.

The recharging station of the present invention features at least one electrical distribution system enclosure that is adapted for incorporation into an electrical distribution system, and located external to electric vehicles. The station has an electric vehicle charging connector, having at least first and second power phases, for electrical connection with a charging outlet of an electric vehicle. The connector is coupled to one of the at least one enclosures. A circuit interrupter in one of the at least one enclosures has line terminals for connection to respective at least first and second phases of an electrical distribution system. A contactor relay in one of the at least one enclosures has respective at least first and second phases coupled to the respective circuit interrupter and electric vehicle charging connector phases and separable contacts for each phase, for selective connection and disconnection of electric power from the electrical distribution system to the charging connector. A recharger controller is coupled to the contactor, for causing selective separation and closing of the separable contacts, so that electrical power is transferred to the electric vehicle. Desirably these features may be incorporated into a single enclosure that can be coupled to the building's existing load center or electrical distribution panelboard. Alternatively, the circuit interrupter can be incorporated into the existing load center that is in turn connected to a downstream recharging station. The recharging station system may also incorporate electric rate metering functions as well as communication capability from the recharger controller to a remote controller. A human machine interface may be coupled to the controller.

The present invention also features a method for charging an electrical vehicle having a charging outlet, comprising providing an electric vehicle recharger as described above, by causing the recharger controller to separate the contactor relay separable contacts; connecting the charging connector to the vehicle charging outlet; and thereafter causing the recharger controller to close the contactor separable contacts, so that electrical power is transferred to the electric vehicle. The recharger controller may cause the contactor to transfer electrical power to the electric vehicle upon occurrence of an event selected from a group of events comprising date, time of day, electric power cost, charging characteristics of the electric vehicle, electric vehicle request, remote operator action, and human operator action. The method may further comprise providing an electric meter coupled to the first and second phases feeding the charging connector and in communication with an electric power provider controller, for providing power consumption information to the power provider. The meter may be in communication with the controller.

Any of the features of the present invention or any combination of those features may be practiced at the discretion of those skilled in the art.

BRIEF DESCRIPTION OF THE DRAWINGS

The teachings of the present invention can be readily understood by considering the following detailed description in conjunction with the accompanying drawings, in which:

FIGS. 9-12 show the charging system of the present invention recharger controller in different representative operational states during charging of an exemplary electric vehicle.

To facilitate understanding, identical reference numerals have been used, where possible, to designate identical elements that are common to the figures.

DETAILED DESCRIPTION

After considering the following description, those skilled in the art will clearly realize that the teachings of my invention can be readily utilized in electric vehicle recharging stations of the present invention, that can be readily installed in new or existing residential or other type building electrical distribution systems, using technology already familiar to electrical distribution system designers, inspection officials and electricians.

Figure 1:
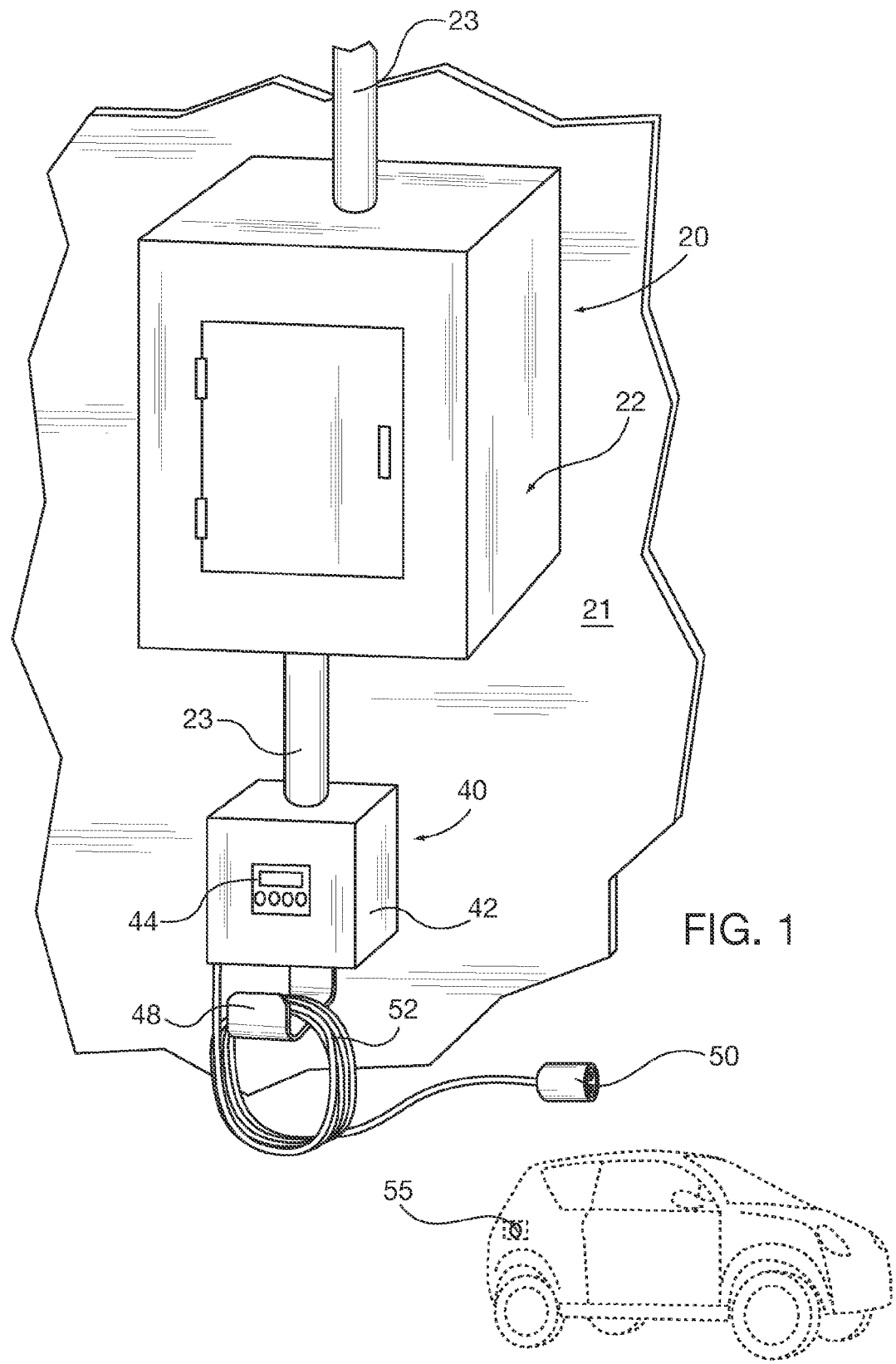
FIG. 1 is an elevational perspective view of the electric vehicle recharging station of the present invention exemplary remote installation from an electrical distribution system load center.
Figure 2:
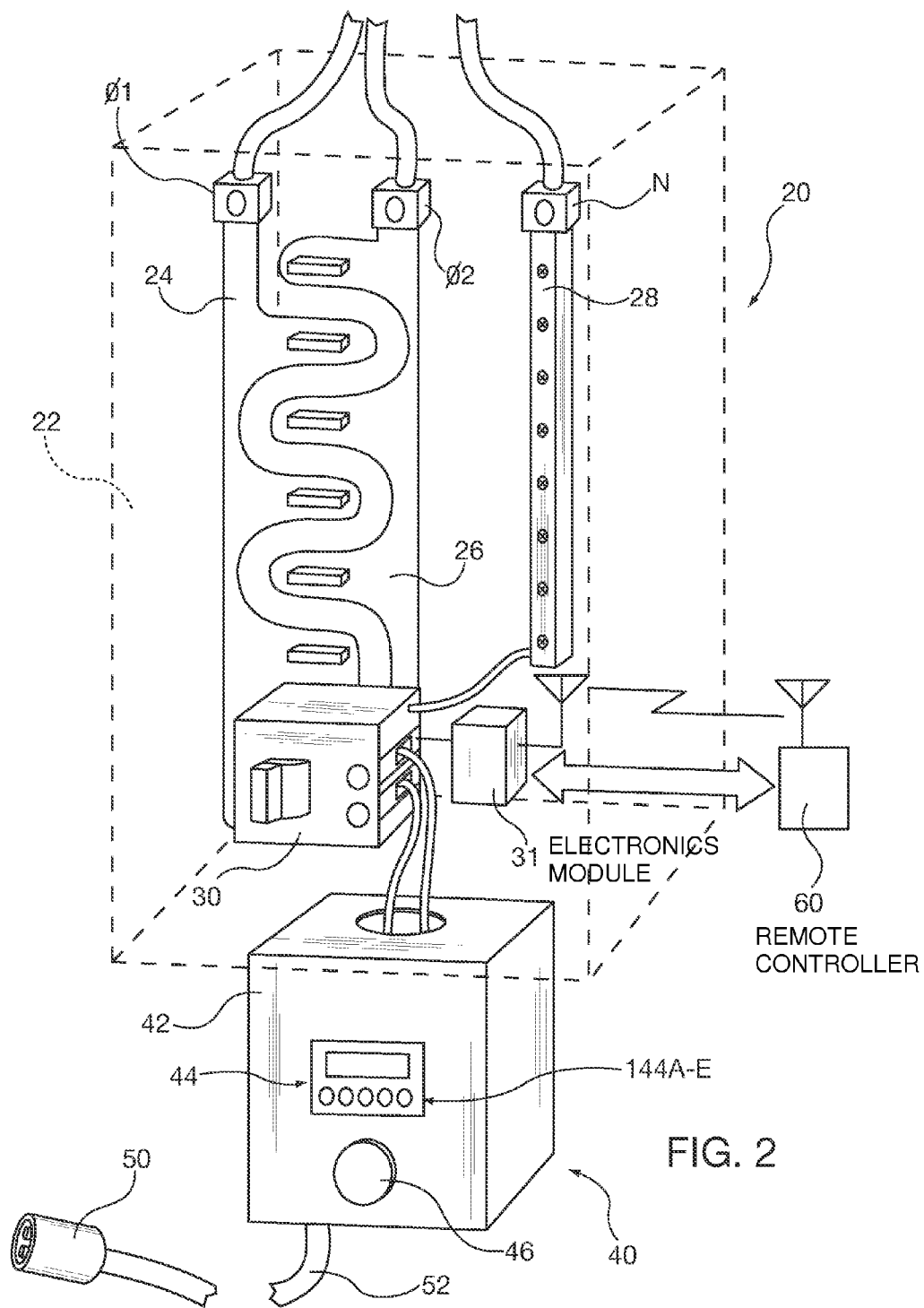
FIG. 2 is an elevational perspective view of the electric vehicle recharging station of the present invention second exemplary installation ganged with an electrical distribution system load center.

Referring generally to FIGS. 1 and 2, a known residential or other building low voltage electrical distribution system load center 20, having enclosure 22 is shown affixed externally to a building wall 21. As is known to those skilled in the art, the load center 20 may be installed flush with the wall surface 21, by insetting it within a wall cavity, for example between wall studs. The conduits 23 retain electrical distribution power circuit wiring that route multi-phase electrical power directly or indirectly from the power grid into the load center 20, and distribute power downstream of the load center to other power circuits.

Load center 20 is of known construction within the electrical power distribution field, and includes respective first and second phase busbars 24, 26 and neutral bus 28. In the United States of America each power phase potential is 120 volts. Stabs on the busbars 24, 26 are adapted for engagement with circuit interrupters, such as a two-pole (phase) ground fault circuit interrupter (GFCI) 30. Circuit interrupters are also referred to as circuit breakers. As is known in the art, the circuit interrupter 30 may include an electronics, module 31 that may control trip operation of the circuit interrupter, provide remote monitoring or power metering functions, and be capable of communication to a remote controller 60 by any known communications medium, including by way of nonlimiting example: high frequency carrier signals through power lines, wireless signals, or computer communications databus, including Zigbee and Internet compatible protocols.

An electric vehicle recharger station system 40 is coupled to the load center 20 downstream by conduit 23 or its enclosure 42 may be ganged directly to the load center enclosure 22 through a knock out and related coupling hardware. The recharger station 40 may optionally include a human-machine interface (HMI) 44 that may include indicator lights, readouts and user-entered instruction keypad. The manual on/off button 46 enables vehicle charging or termination at user discretion. The enclosure 42 may advantageously include a cable hanger 48. An electric vehicle charging connector 50 is coupled to charging cable 52 for insertion into a mating receptacle 55 that is connected to the vehicle.

Figure 3:
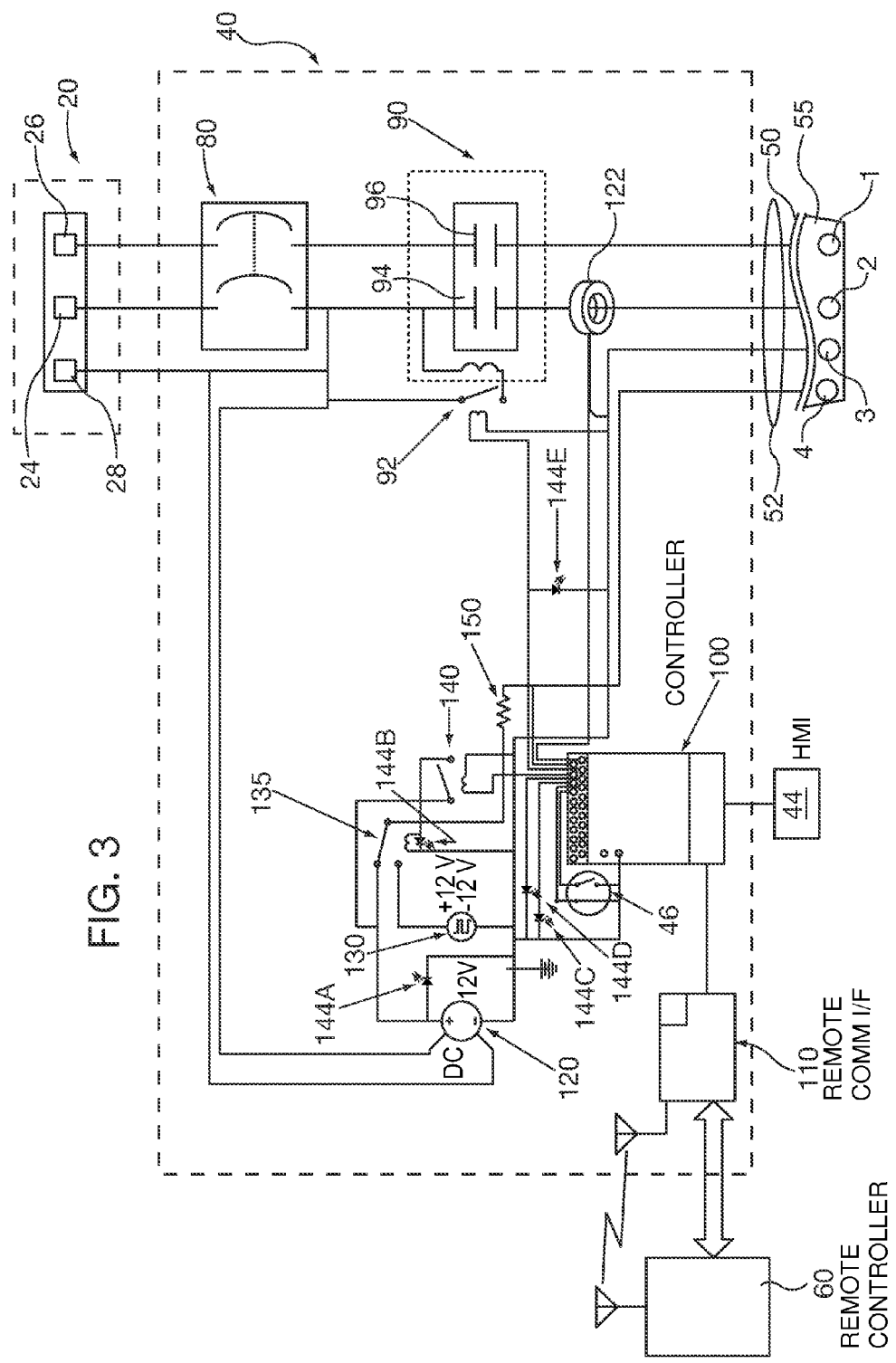
FIG. 3 is a schematic diagram of an exemplary embodiment of control circuits and power distribution of the recharging station of the present invention.
Figure 7:
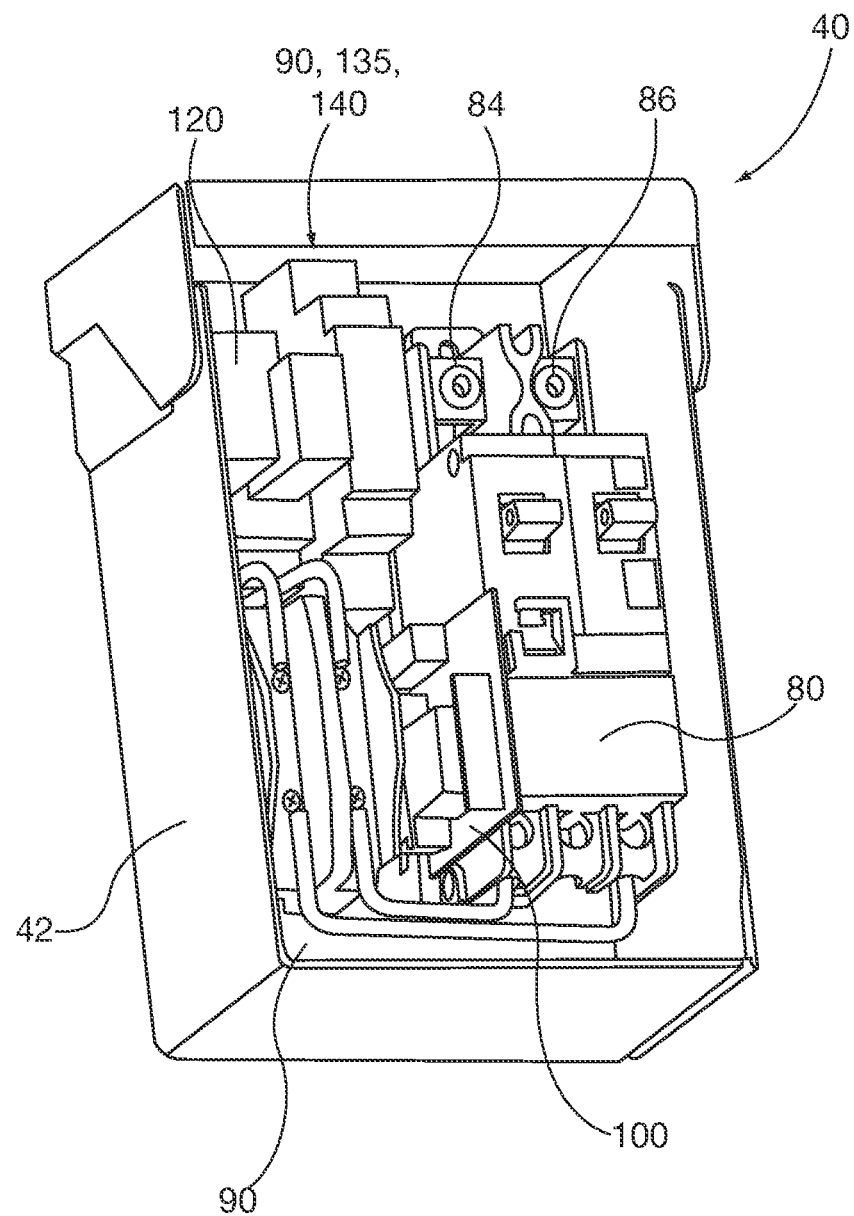
FIG. 7 is a perspective view of exemplary packaging embodiment of the recharging station of the present invention.
Figure 8:
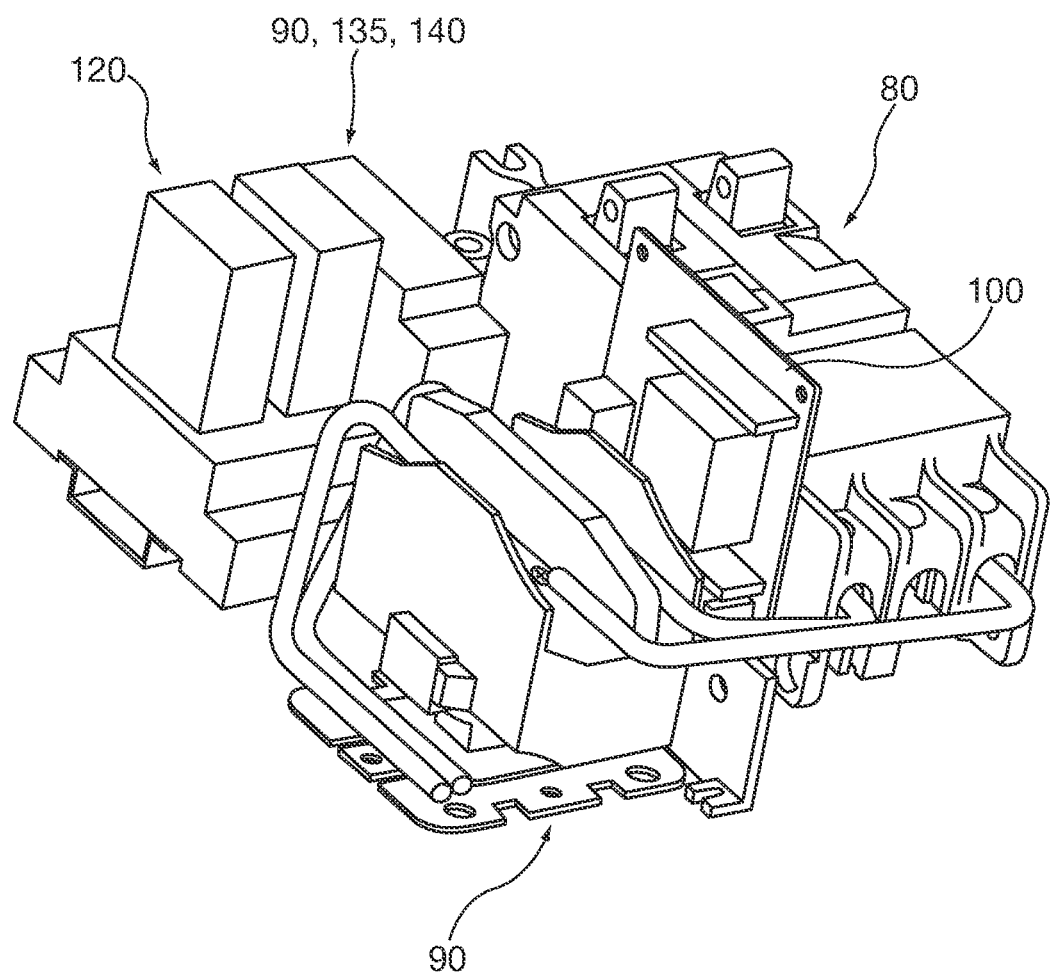
FIG. 8 is another perspective view of exemplary packaging embodiment of the recharging station of the present invention without the enclosure.

Referring to one exemplary embodiment of the present invention recharger station 40, shown in FIG. 3, along with the general exemplary packaging layout shown in FIGS. 7 and 8, circuit interrupter 80 has respective first and second phase line lugs 84, 86 that are coupled to respective phase bus bars 24, 26 in the load center 20. Each of the incoming phases is routed through corresponding downstream output phases through the vehicle charging connector 50 pins 1 and 2. A contactor relay 90 (that is in turn actuated by contactor relay 92) and having pairs of separable contacts 94, 96 for each respective phase selectively connects and disconnects power to the electric vehicle. Contactor 90 is preferably but does not have to be a National Electrical Manufacturers Association (NEMA) motor contactor, the construction, operation and maintenance of which is well known and accepted in the electrical distribution system field.

Charging system recharger controller 100 actuates the contactor relay 92, in order to selectively route power on or off to the electric vehicle. The recharger controller 100 is of known construction in the electrical distribution field, and may include combinations of hardware, firmware, and processors implementing stored software instructions.

The recharger controller 100 may be coupled to or integrate therein a remote communications interface 110 to remote controllers 60 by way of known communications media as was discussed previously with respect to circuit interrupter electronics module 31. Exemplary types of remote controllers 60 may include vehicle controllers, power providers or power distribution service providers controllers (including power company gateways required or promoted in some jurisdictions), and residential monitoring/remote operator controllers. A residential monitoring/remote operator controller would allow a resident to monitor charging operations or change charging status in another part of the home away from the charging station. The recharger controller 100 may also include power metering functions previously described in connection with circuit interrupter electronics module 31. In one embodiment, recharger controller 100 is coupled to optional human-machine interface (HMI) 44.

As shown in FIG. 3, the remainder of exemplary circuitry in the recharger system 40 include a 12 volt direct current power supply 120 coupled directly to the phase and neutral power lines. If the recharger controller 100 incorporates metering functions, a known power transformer 122 (e.g., current transformer (CT) or Rogowski coil), supplies metering information to the recharger controller.

Oscillator 130 in conjunction with single pole double throw (SPDT) relay 135, relay 140 and resistor 15 supply either a 12 volt DC signal or a +/−12 volt square wave oscillating signal to any vehicle connected to car connector 50 in pin 4 of the connector. The purpose for the selective DC or oscillating signal will be described herein with respect to FIGS. 9-12. The HMI 44 may include user-viewable indicator lights concerning recharger system operational parameters, including by way of example one or more of the following:

144A AC power present
144B Vehicle connected to the charger
144C Ready to charge a vehicle
144D System fault exists
144E Charge is in progress The recharger controller 100 may incorporate additional monitoring and control functions, for example actuated by the HMI 44, including metering, selective circuit protection functions, and charging initiation/cessation based on events and parameters stored on the controller or communicated to the controller by way of remote controller 60. For example, the recharger controller 100 may be configured to cause the contactor 90 to transfer electrical power to the electric vehicle selected from a group of events comprising date, time of day, electric power cost, charging characteristics of the electric vehicle, electric vehicle request, remote operator action, and human operator action. A human operator can override recharger controller 100 activation of the contactor 90 by use of HMI 44 or manual on/off switch 46.

Figure 6:
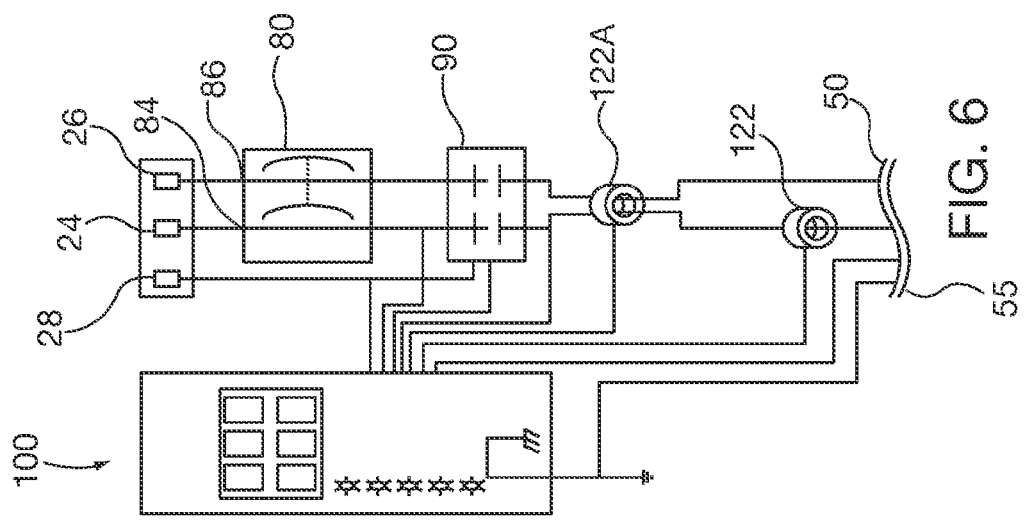
FIG. 6 is a schematic diagram of an exemplary embodiment of a recharging station of the present invention similar to that of FIG. 4, but wherein the controller incorporates circuit protection functions and the circuit interrupter is a standard overload/overcurrent device.
Figure 5:
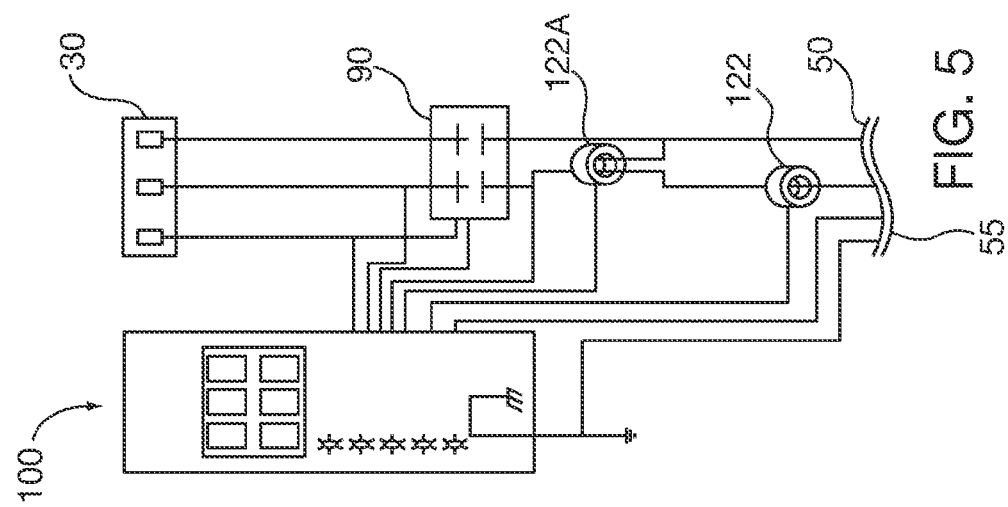
FIG. 5 is a schematic diagram of an exemplary embodiment of a recharging station of the present invention, without a circuit interrupter in the recharging station enclosure wherein the recharger controller incorporates circuit protection functions and the station is wired directly to an electrical distribution system load center standard two pole overload/overcurrent circuit interrupter.
Figure 4:
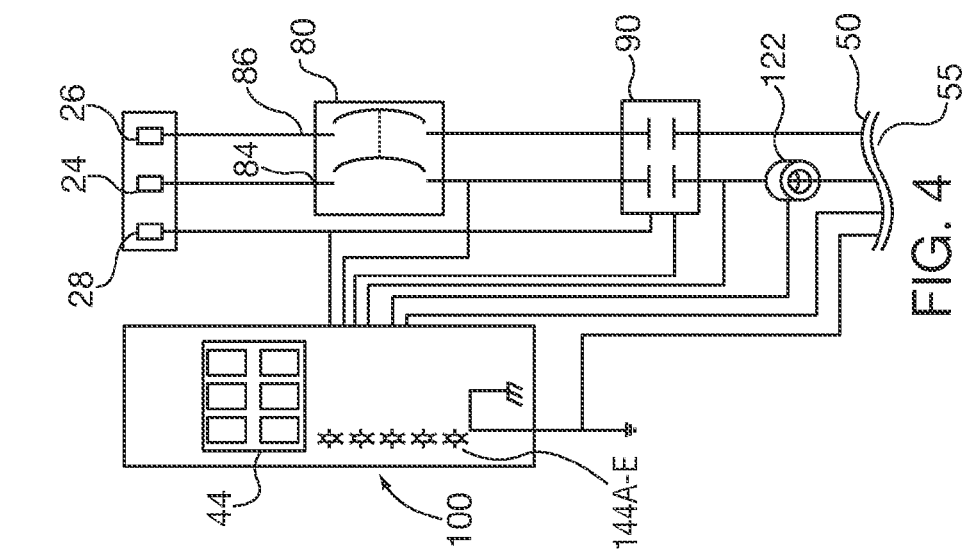
FIG. 4 is a schematic diagram of an exemplary embodiment of a recharging station of the present invention including a GFCI-type circuit interrupter.

FIGS. 4-6 depict exemplary applications of the present invention to different charging station 40 embodiments and recharger controller 100 functionality levels. In FIG. 4 the recharger controller 100 has no ground fault detection capability. The circuit interrupter 80 is a GFCI or CCID with independent self-contained ground fault and other fault monitoring and response capability.

In FIG. 5, the recharger controller 100 is wired to a standard overload/overcurrent two-pole circuit interrupter 30 in the load center 20 and includes one or more fault detection and monitoring functions that would otherwise be performed by a GFCI or CCID circuit breaker. Thus, at the designer's discretion one or more of the circuit monitoring and control functions may be assigned to the recharger controller 100, as may be permissible by applicable codes and product certification standards. In order to enable the additional monitoring and control functions, such as ground fault monitoring, an additional current sensing coil 122A is coupled to the recharger controller. In the embodiment of FIG. 5 the recharging station 40 does not include an internal circuit interrupter 80, thus enabling smaller overall packaging and component cost.

FIG. 6 shows an embodiment incorporating a circuit interrupter 80 that does not incorporate GFCI or CCID monitoring functions. Those additional higher level control and monitoring functions are incorporated in the recharger controller 100. As in the embodiment of FIG. 5, an additional current sensing coil 122A is coupled to the recharger controller 100.

FIGS. 9-12 show the electric vehicle recharger 40 in different charging states mandated by Society of Automotive Engineers SAE J1772 JAN2010 Specification, January 2010, as follows. FIG. 9 shows SAE STATE A, wherein a vehicle is not connected to the charging station 40. Pin 4 of connector 50 reads 12 volts. FIG. 10 shows transition to STATE B, wherein the charging station is connected to the vehicle with connector 50, but the vehicle is not ready to be charged. Oscillator 130 is activated, thereby indicating to the vehicle that the charging station 40 is capable of initiating a charge. The oscillator waveform duty cycle communicates the available charging amperage to the vehicle. The DC or oscillating voltage is 9 volts at pin 4 of connector 50. FIG. 11 shows transition to STATES C or D, wherein pin 4 of connector 50 will read 6 volts or 3 volts, respectively. Vehicles optionally incorporate either of states C or D selected by the vehicle manufacturer. The charger preferably is capable of accommodating either optional state C or D for universal acceptance. FIG. 12 are alternative FAULT STATES, wherein pin 4 will read 0 volts or −12 volts, in accordance with the SAE specification. Although various embodiments which incorporate the teachings of the present invention have been shown and described in detail herein, those skilled in the art can readily devise many other varied embodiments that still incorporate these teachings.

What is claimed is:
1. An electric vehicle recharger, comprising:
an electric vehicle charging connector having first and second connector pins for electrical connection with a charging outlet of an electric vehicle;

a ground fault circuit interrupter located within a load center and having first and second line terminals and first and second load terminals, the first and second line terminals respectively coupled to first and second electrical power phases received at the load center, the load center configured to distribute power downstream of the load center and having at least first and second phase busbars; and a recharging station comprising:
an enclosure;
a contactor located within the enclosure and comprising a first separable contact coupled between the first load terminal and the first connector pin, and a second separable contact coupled between the second load terminal and the second connector pin;
a recharger controller located within the enclosure and coupled to the contactor for selectively opening and closing the first and second separable contacts to selectively transfer electrical power to the electric vehicle, the recharger controller including at least one ground fault detection and monitoring function; and
first and second current sensing coils located within the enclosure and coupled to the recharger controller and between the contactor and the electric vehicle charging connector, wherein the first current sensing coil is configured to supply metering information to the recharger controller, and the second current sensing coil is configured to enable the at least one ground fault detection and monitoring function; wherein:
the recharging station does not include a ground fault circuit interrupter.

2. The recharger of claim 1, further comprising an electric meter coupled to the first and second electrical power phases and in remote communication with a remote controller, for providing power consumption information thereto.

3. The recharger of claim 1, wherein the recharger controller comprises one or more of metering functions, ground fault monitoring functions and charging circuit interrupting device functions.

4. The recharger of claim 1, wherein the recharger controller is in remote communication with a remote controller selected from the group consisting of an electric power provider controller, a remote monitor controller, or an electric vehicle coupled to the connector, that communicates a command to cause the recharger controller to cause electrical power to be selectively transferred to the electric vehicle.

5. The recharger of claim 1, wherein the recharging station is oriented side-by-side with the load center.

6. The recharger of claim 1, further comprising a manual on-off switch for selectively opening and closing the first and second separable contacts.

7. The recharger of claim 1, further comprising an electric meter coupled to the first and second electrical power phases and in remote communication with an electric power provider controller, for providing power consumption information to the power provider.

8. The recharger of claim 1, wherein the charging connector is a Society of Automotive Engineers type J1772 connector.

9. The recharger of claim 1, further comprising a human machine interface coupled to the recharger controller, including system status indicators.

10. A method for charging an electrical vehicle having a charging outlet, comprising:
providing an electric vehicle recharger, having:
an electric vehicle charging connector having first and second connector pins; and
a ground fault circuit interrupter having first and second line terminals and first and second load terminals, the first and second line terminals coupled respectively to first and second electrical power phases received at a load center, the load center configured to distribute power downstream of the load center and having at least first and second phase busbars; and
a recharging station comprising:
an enclosure;
a contactor located within the enclosure and comprising a first separable contact coupled between the first load terminal and the first connector pin, and a second separable contact coupled between the second load terminal and the second connector pin;
a recharger controller located within the enclosure and coupled to the contactor for selectively opening and closing the first and second separable contacts, the recharger controller including at least one ground fault detection and monitoring function; and
first and second current sensing coils located within the enclosure and coupled to the recharger controller and between the contactor and the electric vehicle charging connector, wherein the first current sensing coil is configured to supply metering information to the recharger controller, and the second current sensing coil is configured to enable the at least one ground fault detection and monitoring function; wherein:
the recharging station does not include a ground fault circuit interrupter;
causing the recharger controller to open the separable contacts;
connecting the charging connector to the vehicle charging outlet; and
causing the recharger controller to close the separable contacts, so that electrical power is transferred to the electric vehicle.

11. The method of claim 10, wherein the recharger controller causes the contactor to transfer electrical power to the electric vehicle based on one or more of: date, time of day, electric power cost, charging characteristics of the electric vehicle, electric vehicle request, remote operator action, and human operator action.

12. The method of claim 10, further comprising providing an electric meter coupled to the at least first and second electrical power phases and in remote communication with a remote controller, for providing power consumption information thereto.

13. The method of claim 10, wherein the recharger controller comprises metering functions.

* * * * *